United States Patent [19]

Anderson et al.

[11] 4,236,464
[45] Dec. 2, 1980

[54] INCINERATION OF NOXIOUS MATERIALS

[75] Inventors: Roger E. Anderson, Rancho Cordova; Eugene M. Vander Wall, Citrus Heights, both of Calif.

[73] Assignee: Aerojet-General Corporation, LaJolla, Calif.

[21] Appl. No.: 883,504

[22] Filed: Mar. 6, 1978

[51] Int. Cl.³ .............................................. F23G 7/04
[52] U.S. Cl. ...................................... 110/238; 431/5; 431/7; 431/10; 422/139; 422/170; 110/210
[58] Field of Search ................. 431/5, 7, 10; 422/139, 422/170, 172, 182, 184; 423/481, 240 R, 240 S, 241, DIG. 16; 110/210, 214, 238; 112/243, 245; 122/4 D

[56] References Cited

U.S. PATENT DOCUMENTS

| | | | |
|---|---|---|---|
| 2,488,030 | 11/1949 | Scheineman . | |
| 2,622,970 | 12/1952 | Martin . | |
| 2,862,798 | 12/1958 | McKinney . | |
| 2,919,174 | 12/1959 | Pring | 423/240 S |
| 3,068,812 | 12/1967 | Hemeon | 110/210 |
| 3,495,654 | 2/1970 | Vacubowiez . | |
| 3,725,012 | 4/1973 | Gower . | |
| 3,747,346 | 7/1973 | Onoda et al. | 60/286 |
| 3,757,521 | 9/1973 | Tourtellotte et al. | 60/274 |
| 3,770,369 | 11/1973 | Mikami et al. | 432/15 |
| 3,808,805 | 5/1974 | Miramontes | 60/274 |
| 3,836,321 | 9/1974 | Kobayashi et al. | 432/15 |
| 3,873,671 | 3/1975 | Reed et al. | 431/5 |
| 3,907,971 | 9/1975 | Bohm et al. | 423/240 S |
| 3,917,796 | 11/1975 | Ebeling | 431/5 |
| 3,930,800 | 1/1976 | Schoener et al. | 23/264 |
| 3,962,869 | 6/1976 | Wössner | 60/298 |
| 3,998,929 | 12/1976 | Leyshon | 423/167 |
| 4,017,585 | 4/1977 | Angevine et al. | 423/167 |
| 4,018,879 | 4/1977 | Winnen | 423/481 |

Primary Examiner—Carroll B. Dority, Jr.
Assistant Examiner—Lee E. Barrett
Attorney, Agent, or Firm—John S. Bell

[57] ABSTRACT

A combustion method and apparatus for disposal of materials that release noxious, corrosive, and/or toxic gases when burned, particularly halogens and/or acidic gases, is disclosed herein. In the disclosed system, a waste material is burned, the gaseous products of that combustion are cooled, and the cooled gases are then contacted with an alkaline substance of a Periodic Table Group I.A or II.A element in a fluidized bed to scavenge the noxious, corrosive, and/or toxic components in the combustion products.

1 Claim, 1 Drawing Figure

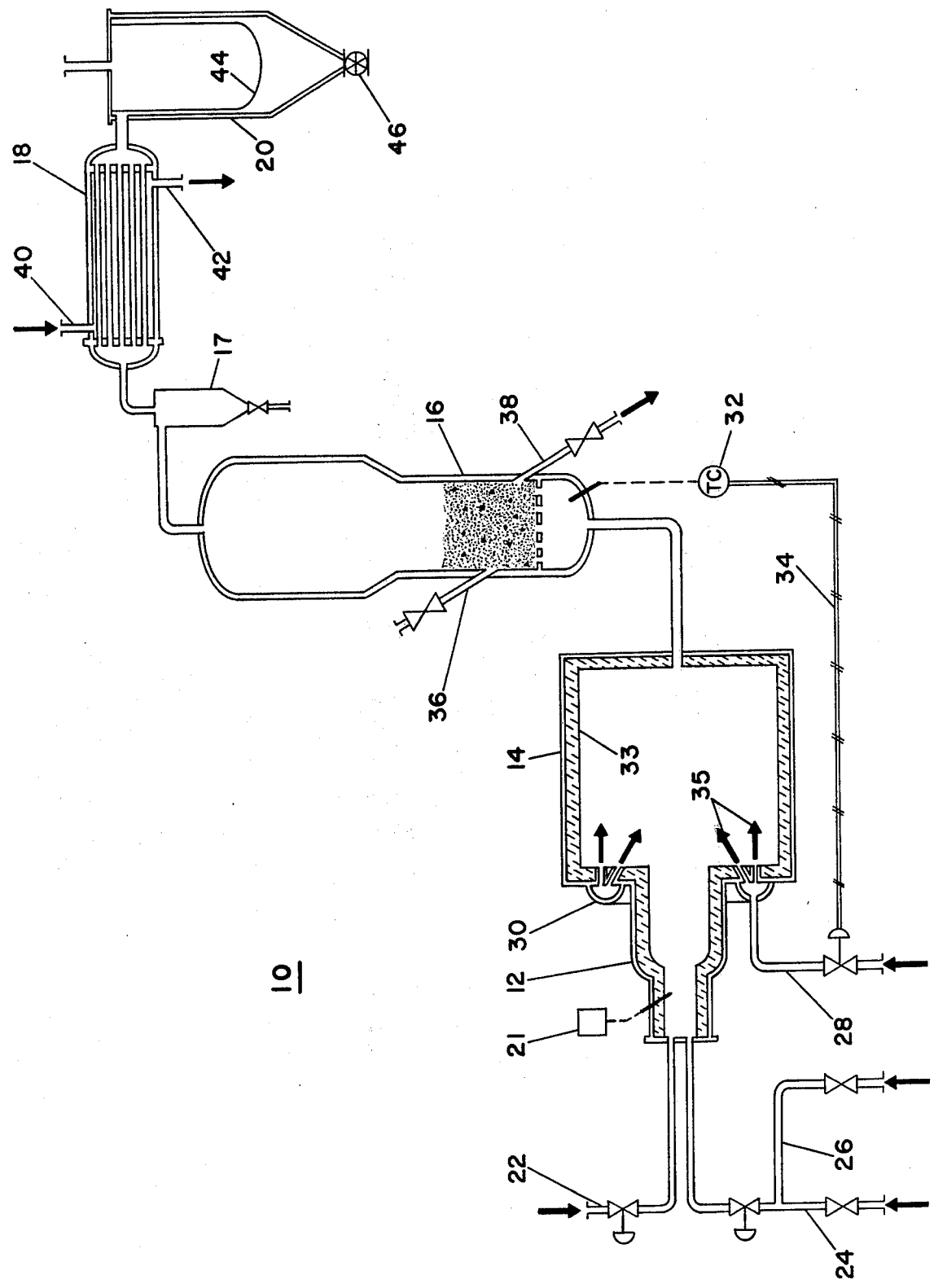

INCINERATION OF NOXIOUS MATERIALS

LICENSE RIGHTS

This invention was developed under Army Contract DAAA15-75-C-0147, and the Government is licensed to practice this invention in accordance with the terms of that contract.

BACKGROUND OF THE INVENTION

1. Field of the Invention

Incineration of waste materials.

2. Brief Description of the Prior Art

Waste quantities of materials that contain one or more of the elements listed below are difficult to dispose of because combustion causes those elements to be released as noxious, corrosive, and/or toxic gases. The halogens are released either as elemental gases, or as acidic gases such as HF, gaseous HCl, etc. The remaining elements are generally released either as acidic oxide gases, or as other gases that are either noxious, corrosive, or toxic.

| Elemental Precursor | As Contained, for Example, in |
|---|---|
| Fluorine | Fluorinated plastics, chemical warfare agents, rocket propellants, refrigerants. |
| Chlorine | Chlorinated plastics, such as PVC, pesticides, chemical warfare agents, rocket propellants, solvents, chemical wastes. |
| Bromine | Chemical wastes. |
| Iodine | Chemical wastes. |
| Nitrogen | Chemical wastes, plastics, rocket propellants. |
| Sulfur | Coal, industrial chemical wastes, fuel oils, chemical warfare agents. |
| Phosphorus | Fertilizers, elemental phosphorus industries, pesticides. |
| Selenium | Associated with sulfur in many ores, electronics industries. |
| Tellurium | Associated with sulfur in many ores, electronics industries. |
| Arsenic | Insecticides, pesticides, herbicides, chemical warfare agents. |

The prior art teaches disposal of materials containing these elements in incineration systems that use wet scrubbers for treatment of the combustion gases. But, appropriate scrubbers are expensive, complicated, and require extensive cooling and temperature control apparatus. The wastes from such scrubbing operations also often present complex disposal problems.

SUMMARY OF THE INVENTION

This invention comprises combustion of a material that releases noxious gases when burned, by burning the material, cooling the gaseous products of that burning, and removing noxious, corrosive, and toxic gas constituents from the cooled gases by contact with an alkaline substance of a Group I.A or Group II.A element, preferably in a fluidized bed reactor. The separate burning and scavenging, with intermediate cooling permits fluidized bed scavenging, and use of an inexpensive and easy-to-handle scavenging material that has a melting temperature below the combustion temperature of the material being burned, and thus could not be used effectively if there were no cooling. The fluidized bed reactor provides effective contact between the combustion gases and scavenging material without requiring excessive apparatus, expenditure of energy, or control.

In practice, either any of the elements listed above, or substantially any compound containing one or more of those elements, or any other material that releases an equivalent corrosive acidic gas when burned, can be burned in accordance with this invention. And, combustion gases can be scavenged by contact with any alkaline substance of a Group I.A or Group II.A element, or in other words, any alkaline compound or material containing a Group I.A or Group II.A element as one constituent. But, because wastes containing certain elements are much more common than others, it is anticipated that this invention will be used most often for incineration of compounds containing fluorine, chlorine, nitrogen and/or sulfur constituents. And, it is believed that oxides, hydroxides and carbonates of sodium, potassium, magnesium and calcium will be used most often as scavenging agents. These are all relatively common, inexpensive, easy to handle, and effective scavenging materials, whereas lithium, rubidium, cesium, beryllium, strontium and barium are all rare and comparatively expensive.

| Scavenging Materials | |
|---|---|
| Group I.A., Alkali Metals | Group II.A., Alkali Earth |
| Lithium | Beryllium |
| Sodium | Magnesium |
| Potassium | Calcium |
| Rubidium | Strontium |
| Cesium | Barium |

BRIEF DESCRIPTION OF THE DRAWING

The FIGURE is a cutaway schematic illustration of a system for incineration of noxious, corrosive, and/or toxic materials, or nonhazardous material that releases noxious, corrosive or toxic gases when burned.

DETAILED DESCRIPTION OF THE PREFERRED EMBODIMENT

The drawing illustrates an incineration system 10 that includes a combustion chamber 12, a cooling chamber 14, a fluidized bed scavenging reactor 16, a cyclone separator 17, a heat exchanger 18, and a filter assembly 20. Conventional furnace ignition apparatus 21, and valved feedlines 22, 24 and 26 are connected to combustion chamber 12 to provide ignition and supplies of air, material for incineration, and start-up fuel, respectively. And, a valved coolant feedline 28, injection manifold 30, thermostat-type temperature control 32, and pneumatic control line 34, are disposed to provide a controlled coolant flow to chamber 14. Chambers 12 and 14 include an inner lining 33 of ceramic or other material that is resistant to corrosion by acidic and halogen gases. And, to further minimize corrosion, manifold 30 includes multiple slots 35 so that a portion of the coolant fluid is directed to flow along the walls of chamber 14 to help keep combustion gases in the chamber away from the chamber walls, while another portion is directed toward the center of that chamber to mix with and cool those gases. The scavenging reactor 16 is of the fluidized bed type. It includes conduit 36 for introduction of fresh scavenging reagent and conduit 38 for removal of spent reagent and scavenged wastes. The cyclone separator 17, heat exchanger 18, and filter assembly 20 are all conventional structures. The heat exchanger 18 includes lines 40 and 42 for through flow of water or other coolant. And, the filter assembly 20 includes a fabric bag 44 disposed to receive particulate matter from the combustion gases and cause removed particulate to fall into the outer container of assembly 20 where it may be removed by valved outlet 46.

In operation, a clean hydrocarbon fuel such as natural gas or kerosene will typically be used for starting up incineration in chamber 12. The typical materials to be incinerated in this system 10 as discussed above, will generally burn at or about about 3000° F. For illustration, four representative oxidation reactions involving release of corrosive gases are qualitatively set forth below.

Oxidation Reactions $$CH_xCl_y + O_2 \rightarrow CO_2 + H_2O + HCl$$

$$CH_xF_y + O_2 \rightarrow CO_2 + H_2O + HF$$

$$CH_xS_y + O_2 \rightarrow CO_2 + H_2O + SO_2$$

$$CH_xN_y + O_2 \rightarrow CO_2 + H_2O + NO$$

The scavenging materials preferred for use in reactor 16 may fuse or otherwise be ineffective at waste combustion temperatures. Temperature control 32 senses the temperature of the gas flow entering fluidized bed reactor 12, and is preadjusted to provide a flow of air or other coolant fluid through line 28 to chamber 14 at a rate that causes the combustion gases to be cooled in that chamber 14 to a prescribed temperature. The prescribed temperature may vary with the chemical nature of the scavenging agent and noxious gas components to be scavenged but is selected to meet the following criteria: (1) less than the softening temperature of the scavenging agent and the scavenging reaction products; (2) less than the dissociation temperature of the scavenging reaction products, and (3) a temperature which kinetically favors the desired scavenging reaction. Corrosive and toxic gases are scavenged from the combustion gases, or in other words attached by chemical reaction to the particulate material in reactor 16 by reactions similar to the representative examples listed below.

Scavenging Reactions $$2HCl + Na_2CO_3 \rightarrow 2NaCl + H_2O + CO_2$$

$$2HF + CaO \rightarrow CaF_2 + H_2O$$

$$SO_2 + Na_2CO_3 + \tfrac{1}{2}O_2 \rightarrow Na_2SO_4 + CO_2$$

$$2NO + Na_2CO_3 + \tfrac{1}{2}O_2 \rightarrow 2NaNO_3 + CO_2$$

Cyclone separator 17 removes larger particles from the gas flow to prevent clogging of heat exchanger 18. And, heat exchanger 18 and filter 20 provide final cooling and clean-up so that the scavenged combustion gases can be safely discharged into the atmosphere.

Having thus provided this description, modifications will be obvious to those skilled in this art.

Therefore what is claimed is:

1. A system for incineration of materials containing halogen or acidic gas constituents comprising:
   a combustion chamber lined with a ceramic material to minimize combustion gas corrosion;
   a cooling chamber also lined with a ceramic material to minimize combustion gas corrosion for receiving and cooling gases from said combustion chamber;
   means for injecting coolant fluid into said cooling chamber along both a first path for mixing with and cooling gases from said combustion chamber, and a second path for containing said combustion gases to further minimize contact and corrosion of said cooling chamber;
   a non-recirculating type fluidized bed scavenging reactor for receiving said cooled combustion gases such that said gases fluidize particulate bed material in said reactor; and
   means for receiving, cooling and filtering combustion gases from said fluidized bed reactor.

* * * * *